United States Patent
Yang et al.

(10) Patent No.: US 8,165,106 B2
(45) Date of Patent: Apr. 24, 2012

(54) APPARATUS AND METHOD FOR DETECTING A RANGING SIGNAL IN A WIRELESS COMMUNICATION SYSTEM

(75) Inventors: Ha-Young Yang, Yongin-si (KR); Seung-Joo Maeng, Seongnam-si (KR); Ik-Beom Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 547 days.

(21) Appl. No.: 12/331,941

(22) Filed: Dec. 10, 2008

(65) Prior Publication Data

US 2009/0154399 A1 Jun. 18, 2009

(30) Foreign Application Priority Data

Dec. 14, 2007 (KR) .................. 10-2007-0130647

(51) Int. Cl.
*H04J 13/00* (2011.01)
*H04J 3/06* (2006.01)
*H04L 7/00* (2006.01)

(52) U.S. Cl. ........ 370/350; 370/328; 370/342; 370/208; 370/210; 455/434; 455/502; 375/356

(58) Field of Classification Search .................. 370/350, 370/503, 504, 520; 375/356
See application file for complete search history.

(56) References Cited

U.S. PATENT DOCUMENTS

| 7,586,976 B1* | 9/2009 | Duggan ..................... 375/144 |
| 7,839,817 B2* | 11/2010 | Wang et al. ................... 370/328 |
| 2007/0058524 A1* | 3/2007 | Modlin et al. ................ 370/208 |
| 2007/0060180 A1* | 3/2007 | Muharemovic et al. ...... 455/509 |

FOREIGN PATENT DOCUMENTS

| KR | 10-2006-0063276 A | 6/2006 |
| KR | 10-0634979 B1 | 10/2006 |
| KR | 10-2006-0134458 A | 12/2006 |
| KR | 10-2009-0027834 A | 3/2009 |

* cited by examiner

*Primary Examiner* — Huy Vu
*Assistant Examiner* — Maria Sekul
(74) *Attorney, Agent, or Firm* — Jefferson IP Law, LLP

(57) ABSTRACT

An apparatus for a base station of a wireless communication network includes a detector to detect an access code received from a mobile station in each of a plurality of time durations and to detect a timing offset of the access code detected in each of the plurality of time durations, an estimator to estimate a carrier-to-interference noise ratio (CINR) during each of the plurality of time durations, and a determining unit to determine a timing offset correction value to be applied to subsequent signals from the mobile station using the CINR, the timing offset, and the access code detected in each of the plurality of time durations.

18 Claims, 4 Drawing Sheets

APPARATUS AND METHOD FOR DETECTING A RANGING SIGNAL IN A WIRELESS COMMUNICATION SYSTEM

PRIORITY

This application claims the benefit under 35 U.S.C. §119 (a) of a Korean patent application filed in Korean on Dec. 14, 2007 and assigned Application No. 10-2007-0130647, the entire disclosure of which is hereby incorporated by reference.

BACKGROUND OF THE INVENTION

1. Field of the Invention

The present invention relates to an apparatus and method for detecting synchronization in a wireless communication system. More particularly, the present invention relates to an apparatus and method for detecting ranging signals.

2. Description of the Related Art

In general, voice services have been a primary concern in the development of communication systems. As communication technologies have advanced, voice services as well as various multimedia and data services are becoming increasingly important. However, voice-based communication systems have failed to satisfy user demand for multimedia and data services due to a relatively small transmission bandwidth and expensive service fees. Moreover, the development of communication industries and the growing demand for Internet services have resulted in an increased need for a communication system capable of effectively providing Internet services. Accordingly, a broadband wireless communication system has been introduced to effectively provide broadband Internet services.

In general, the broadband wireless access communication system uses an orthogonal frequency division multiplexing (OFDM)/orthogonal frequency division multiple access (OFDMA) scheme to achieve high-speed data communication when a physical channel signal is transmitted using a plurality of sub-carriers. A wireless access scheme of the broadband wireless communication system is being standardized by the Institute of Electrical and Electronics Engineers (IEEE) 802.16 group, which is one of the international standardization organizations.

Ranging is one of several random access processes defined in the broadband wireless communication system. Ranging can be classified into several categories, such as initial ranging, periodic ranging, bandwidth request ranging, handover ranging, etc. Initial ranging, in particular, is used to detect a propagation delay in order to adjust frame synchronization (or time synchronization) of a user device attempting an access to a network.

An initial ranging signal is a signal used when the user device in a particular cell accesses a communication system of the cell. The initial ranging signal is used to align a start point of a frame between the system and the user device by correcting a propagation delay parameter that can varies according to the location of the user device. When using a time division duplex (TDD) system, it is required to achieve uplink and downlink synchronization within a reference time period.

If initial ranging detection is unsuccessful, or if detected signal information has errors, a user device attempting access to a cell cannot receive communication services or may cause interference with another user device due to incorrect frame synchronization. That is, latency of a mobile station (MS) and deterioration of reception throughput may lead to degradation in overall performance of a communication system.

FIG. 1 generally illustrates detection of timing offset during initial ranging. For convenience of explanation, an IEEE 802.16-based ranging signal structure is used as an example. However, other ranging signal formats may be used without departing from the scope of the present invention.

As shown in FIG. 1, during initial ranging, an MS (e.g., a user device) repeatedly transmits a randomly selected ranging code during a detection period corresponding to two OFDM symbols 100. A sample offset corresponding to a cyclic prefix (CP) 102 is provided between a first OFDM symbol and a second OFDM symbol in order to deal with a multi-path channel.

In general, a cell radius for purposes of detecting the initial ranging signal is about several kilometers (km). A timing offset within a length of one OFDM symbol has to be estimated for an initial ranging allocation period. A transmit transition gap (TTG) 110 is provided between downlink and uplink transmissions in a TDD system. The TTG 110 corresponds to a time period in which a base station (BS) can switch from a transmit (Tx) mode to a receive (Rx) mode. During the TTG 110, the BS allows an antenna to switch to receiving data (Rx mode) instead of transmitting data (TX mode) and also allows a receiver to be in an operational state. A TTG value is determined according to a round trip delay (RTD) and a subscriber station receiver-transmit turnaround gap (SSRTG). The RTD depends on a distance between the BS and the MS. The SSRTG is an MS switching period 108 corresponding to a Tx/Rx switching gap of the MS.

As shown in FIG. 1, for an early arriving sample 104, a time offset detection period 114 starts earlier than an initial ranging reference timing 112 by a predetermined number of samples and has a length enough to estimate a timing offset within one OFDM symbol. As in the case of the early arriving sample 104 and a late arriving sample 106 shown in FIG. 1, detection of time offset is possible when an OFDM symbol for transmitting a ranging code of a user device is delivered within the time offset detection period 114.

Table 1 below defines a TTG/RTG period required for uplink/downlink switching within one frame according to bandwidth and shows a profile adopted in the IEEE 802.16d/e standard.

TABLE 1

| Bandwidth | FFT | Sampling Frequency | CP Duration | Symbol Duration | No. of Symbol | TTG | RTG | Cell Radius Limit |
|---|---|---|---|---|---|---|---|---|
| 10 MHz | 1024 | 11.2 MHz | 11.2 μsec 128 samples | 102.9 μsec 1152 samples | 47 | 105.7 μsec | 60 μsec | 8.4 km |
| 8.75 MHz | 1024 | 10 MHz | 12.8 μsec 128 samples | 115.2 μsec 1152 samples | 42 | 87.2 μsec | 74.4 μsec | 5.6 km |
| 7 MHz | 1024 | 8 MHz | 16 μsec 128 samples | 144 μsec 1152 samples | 33 | 188 μsec | 60 μsec | 20.7 km |

According to Table 1, a maximum cell radius is about 8.4 km for a 10 MHz bandwidth, for example. For initial ranging, the timing offset detection period may be set to one OFDM symbol time of about 91.4 microseconds (μs). When timing offset detection is performed in the range of about −512 samples to about +511 samples with respect to early and late arrivals, the maximum cell radius is about 15 km.

As broadband wireless communication system spreads across the world, service regions may be considered differently from one service provider to another. In addition, with the diversification of targets of services to be provided, a problem arises in that a region to be covered may have a much larger radius than a typical cell radius. For example, with the introduction of a wide-area cell BS system in which one BS has to cover an area in the range of about 20 to about 30 km, there is a need for a method and system capable of operating such wide cell system without errors under a standard. The wide cell system can generally operate normally when the initial ranging can correct MS frame synchronization that differs significantly from a BS frame.

Typical method and system of detecting the initial ranging signal has some of the following problems. For example, typical ranging detection algorithm detects a timing offset within a range of about −512 to about +511 samples with respect to a 1024-Fast Fourier Transform (FFT) as shown in Table 1 above. If a cell radius is large, an initial ranging signal from the MS may be delivered before −512 sample timing (i.e., early arrival) or after +511 sample timing (i.e., late arrival). In this case, ambiguity for the timing offset occurs. Accordingly, there is a need for a method and system capable of correctly detecting a timing offset in a BS when a delivered ranging signal is not within a given detection period.

SUMMARY OF THE INVENTION

An aspect of the present invention is to solve at least the above-mentioned problems and/or disadvantages and to provide at least the advantages described below. Accordingly, an aspect of the present invention is to provide an apparatus and method for detecting an initial ranging signal in a communication system.

Another aspect of the present invention is to provide an apparatus and method for detecting a timing offset of an initial ranging signal in a plurality of orthogonal frequency division multiplexing (OFDM) symbol durations in a communication system.

Another aspect of the present invention is to provide an apparatus and method for estimating a timing offset in a communication system, wherein ranging detection is independently performed in a first OFDM symbol duration and a second OFDM symbol duration and a timing offset correction value is estimated by using two ranging detection results.

In accordance with an aspect of the present invention, an apparatus for a base station of a wireless communication network includes a detector to detect an access code received from a mobile station in each of a plurality of time durations and to detect a timing offset of the access code detected in each of the plurality of time durations, an estimator to estimate a carrier-to-interference noise ratio (CINR) during each of the plurality of time durations, and a determining unit to determine a timing offset correction value to be applied to subsequent signals from the mobile station using the CINR, the timing offset, and the access code detected in each of the plurality of time durations.

In accordance with another aspect of the present invention, a method for a base station of a wireless communication system includes detecting an access code received from a mobile station in each of a plurality of time durations and a timing offset of the access code detected in each of the plurality of time durations, estimating a carrier-to-interference noise ratio (CINR) during each of the plurality of time durations, and determining a timing offset correction value to be applied to subsequent signals from the mobile station using the CINR, the timing offset, and the access code detected in each of the plurality of time durations.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various details to assist in that understanding but these are to be regarded as merely exemplary. Accordingly, those of ordinary skill in the art will recognize that various changes and modifications of the embodiments described herein can be made without departing from the scope and spirit of the invention.

Hereinafter, an apparatus and method for estimating a timing offset of a user device (i.e., a mobile station (MS)) performing initial ranging in a broadband wireless communication system will be described according to exemplary embodiments of the present invention. Although an orthogonal frequency division multiplexing access (OFDMA) based broadband wireless access communication system will be described as an example in the following descriptions, the present invention may be applied to other communication systems which require estimation of a timing offset between a base station (BS) and the MS without departing from the scope of the present invention.

Figure 1:
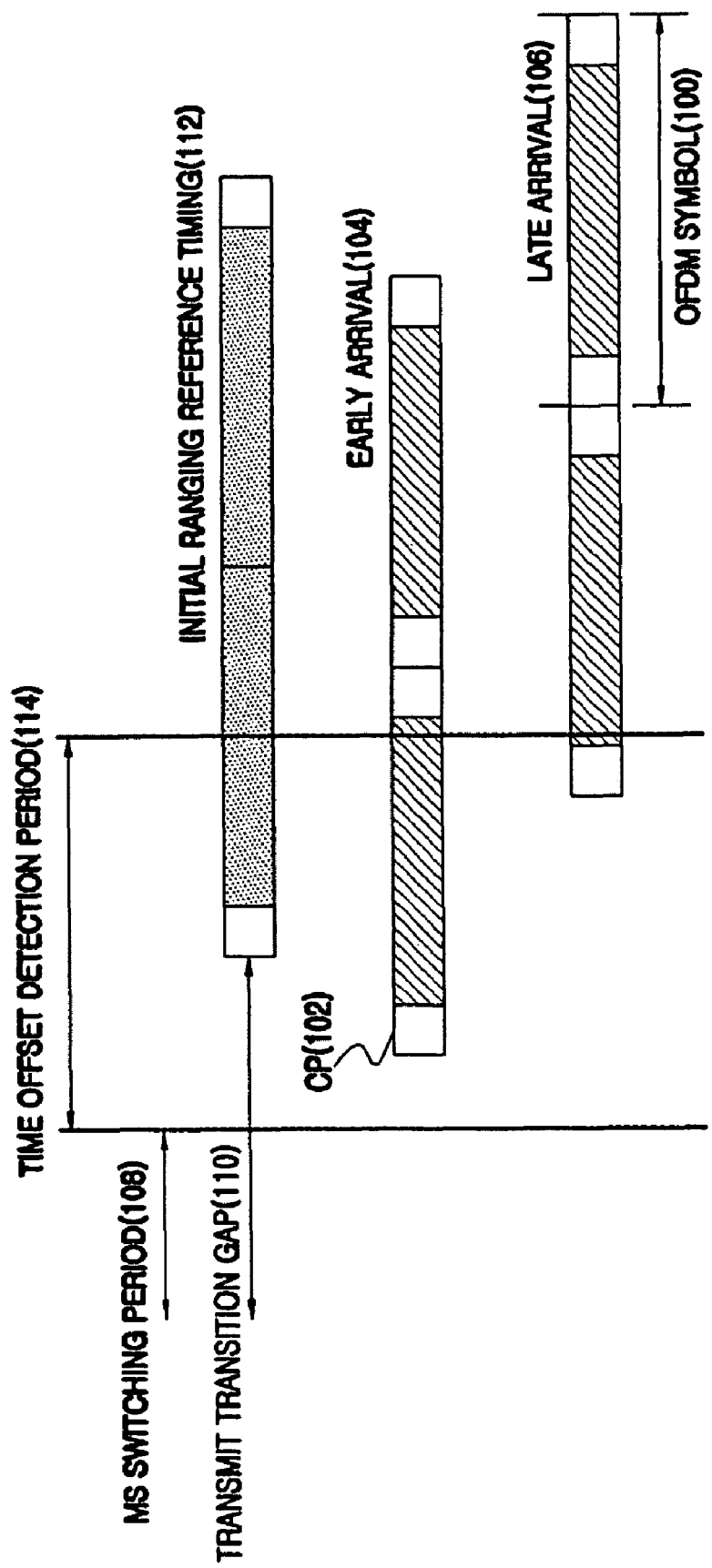
FIG. 1 illustrates in general detection of a timing offset during a detection period of initial ranging.
Figure 2:
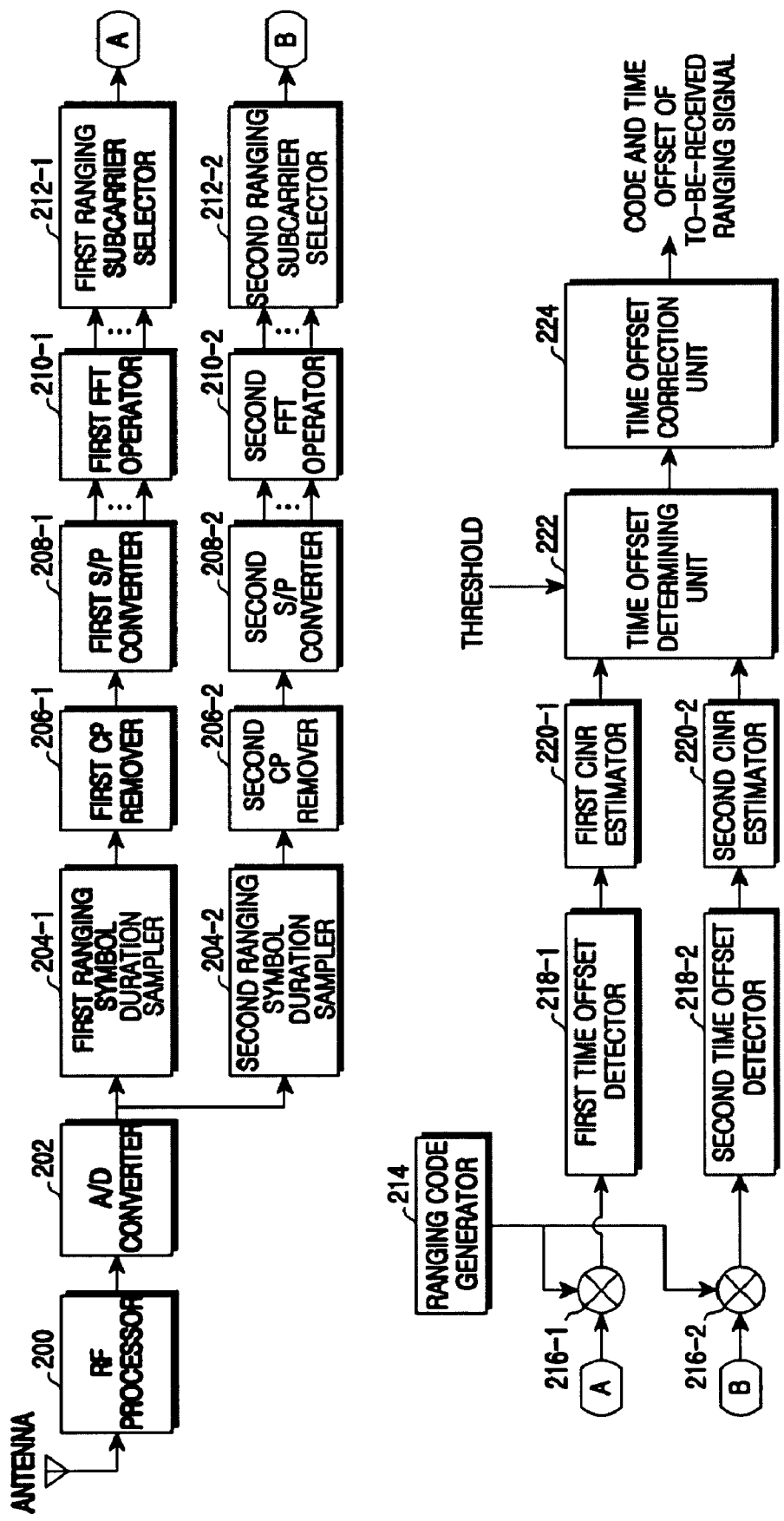
FIG. 2 is a block diagram illustrating a structure of a receiver in a broadband wireless communication system according to an exemplary embodiment of the present invention.

FIG. 2 is a block diagram illustrating a structure of a receiver in a broadband wireless communication system according to an exemplary embodiment of the present invention. As shown in FIG. 2, the receiver in a base station (BS) includes a radio frequency (RF) processor 200, an analog-to-digital (A/D) converter 202, a plurality of ranging symbol duration samplers 204-1 to 204-2, a plurality of cyclic prefix (CP) removers 206-1 to 206-2, a plurality of serial-to-parallel (S/P) converters 208-1 to 208-2, a plurality of Fast Fourier Transform (FFT) operators 210-1 to 210-2, a plurality of ranging subcarrier selectors 212-1 to 212-2, a ranging code generator 214, a plurality of code demodulators 216-1 to 216-2, a plurality of time offset detectors 218-1 to 218-2, a plurality of carrier-to-interference noise ratio (CINR) estimators 220-1 to 220-2, a time offset determining unit 222, and a time offset correction unit 224.

As shown in FIG. 2, the RF processor 200 includes a filter, a frequency converter, etc. (not shown) to process an RF signal. The RF processor 200 converts the RF signal received through a receive (Rx) antenna into a baseband signal. The A/D converter 202 converts the analog baseband signal output from the RF processor 200 into a digital signal (i.e., sample data). Each of the plurality of ranging symbol duration samplers 204-1 to 204-2 selects a data sample from the sample data output by the A/D converter 202 corresponding to an orthogonal frequency division multiplexing (OFDM) symbol duration. As an example, the first ranging symbol duration sampler 204-1 extracts a first data sample from the sample data corresponding to the first of two consecutive OFDM symbol durations, and the second ranging symbol duration sampler 204-2 extracts a second data sample from the sample data corresponding to the second of the two OFDM symbol durations. Each of the plurality of CP removers 206-1 to 206-2 removes a cyclic prefix (CP) from the data sample corresponding to an OFDM symbol duration output from its corresponding ranging symbol duration sampler 204.

Each of the plurality of S/P converters 208-1 to 208-2 converts the data sample output from its corresponding CP remover 206 into parallel data. Each of the plurality of FFT operators 210-1 to 210-2 performs an FFT operation on the parallel data provided from its corresponding S/P converter 208 to output subcarrier values (i.e., frequency-domain data).

Each of the plurality of ranging subcarrier selectors 212-1 to 212-2 selects ranging data from the frequency-domain data output from its corresponding FFT operator 210. The ranging code generator 214 generates ranging codes included in a ranging code set and provides the ranging codes sequentially to the plurality of code demodulators 216-1 to 216-2. Each of the plurality of code demodulators 216-1 to 216-2 performs code demodulation by multiplying the ranging data received from its corresponding ranging subcarrier selector 212 with each of the ranging codes output from the ranging code generator 214. That is, the plurality of code demodulators 216-1 to 216-2 correlate the received ranging data with each of the respective ranging codes to generate correlation data. Accordingly, the number of correlation data generated is the same as the number of codes generated by the ranging code generator 214.

Each of the plurality of time offset detectors 218-1 to 218-2 extracts a timing offset value and a ranging code number of a potential ranging code in the received signal based on the correlation data output from the respective code demodulator 216. That is, each of the plurality of time offset detectors 218-1 to 218-2 evaluates the correlation data to determine a ranging code that generates a peak in the correlation data and estimates a timing offset depending on a position of the peak to output the estimated timing offset. In this case, a ranging code number of the determined ranging code, code demodulation data corresponding to the determined ranging code, and a corresponding timing offset are output.

Each of the plurality of CINR estimators 220-1 to 220-2 estimates a CINR value by using the timing offset and the correlation data (i.e., code modulation data) output from its corresponding code demodulator 216. For convenience of explanation, it is assumed hereinafter that a ranging signal is detected in each of two consecutive OFDM symbol durations. That is, the first CINR estimator 220-1 estimates a CINR of a ranging signal obtained during a first ranging symbol duration, and the second CINR estimator 220-2 estimates a CINR of a ranging signal obtained during a second ranging symbol duration subsequent to the first ranging symbol duration.

The time offset determining unit 222 determines a final timing offset for a ranging signal by using the CINR value of the ranging signal detected in the first ranging symbol duration and the CINR value of the ranging signal detected in the second ranging symbol duration. The time offset correction unit 224 evaluates a timing offset value input from the time offset determining unit 222 and then performs timing correction according to the evaluation result. The timing correction may be an operation in which the receiver of the BS directly corrects a received signal, or the timing correction may be an operation in which a correction value is reported to a transmitter of the MS using a ranging response (RNG-RSP) message, for example.

Figure 3:
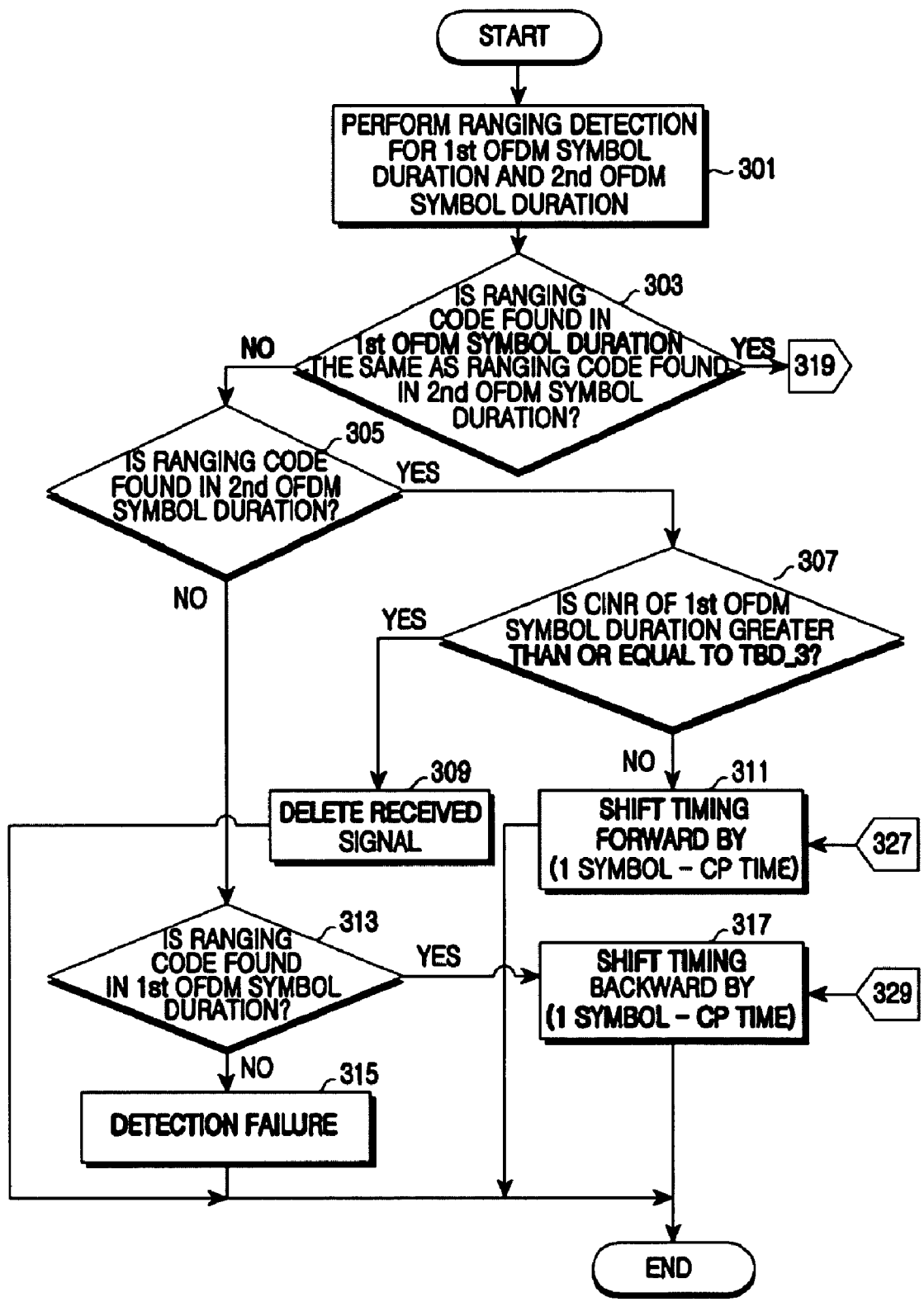
FIGS. 3 and 4 are flowcharts illustrating an operation for determining a timing offset in accordance with an exemplary embodiment of the present invention.

FIG. 3 is a flowchart illustrating an operation of a receiver in a wireless communication system according to an exemplary embodiment of the present invention. For purposes of explanation, it is assumed hereinafter that an initial ranging timing offset is estimated using two consecutive OFDM symbol durations. However, it is to be understood that different number of symbol durations may be used without departing from the scope of the invention.

Figure 4:
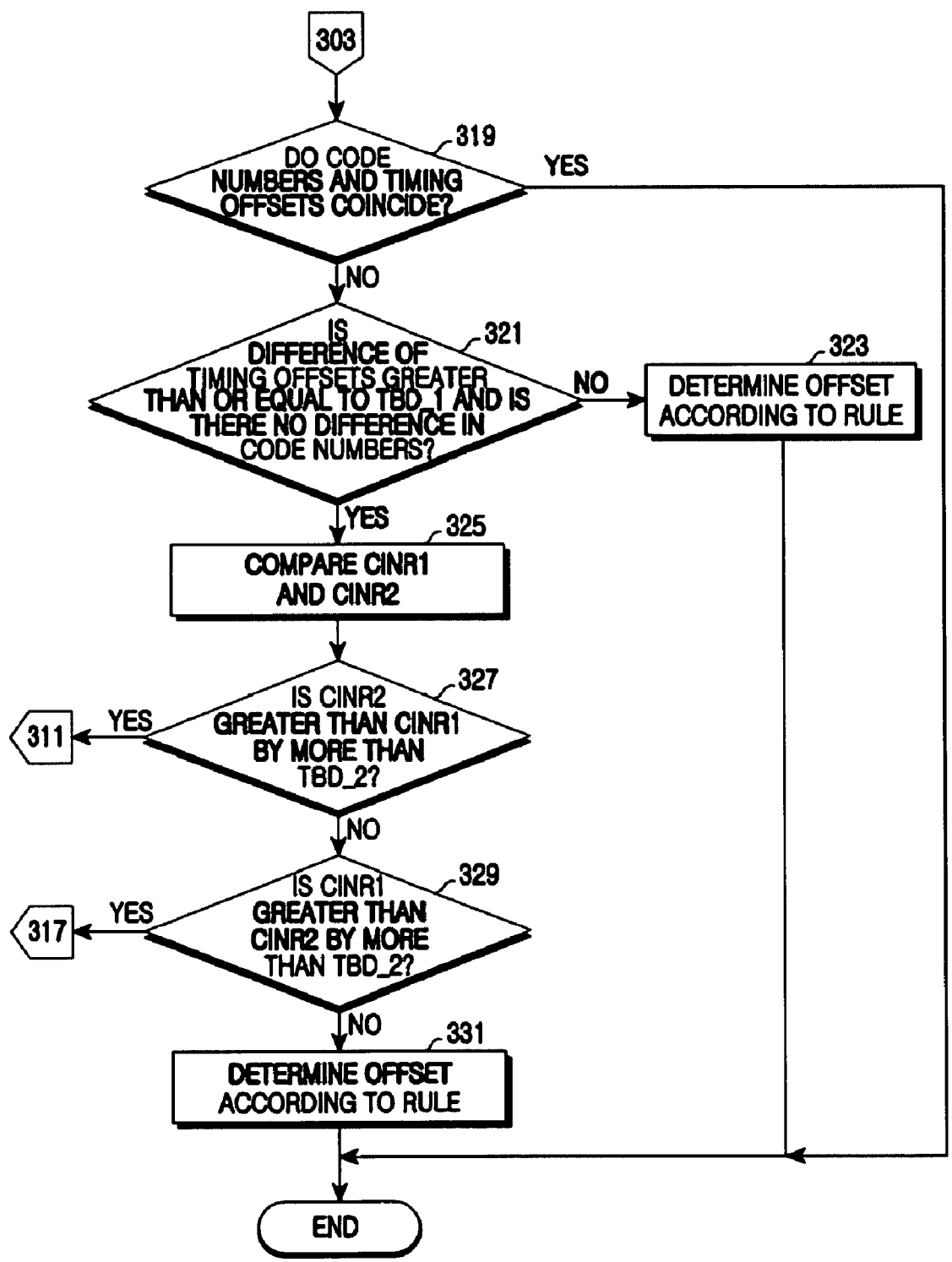

As shown in FIG. 3, in step 301, the receiver performs initial ranging detection to determine a potential ranging code in each of a first OFDM symbol duration and a second OFDM symbol duration. In step 303, the receiver determines whether the potential ranging codes found in each of the first OFDM symbol duration and the second OFDM symbol duration match a ranging code assigned to the receiver. In particular, if both of the potential ranging codes of the two OFDM symbol durations match the same ranging code, the operation proceeds to step 319 (FIG. 4). If not, the operation proceeds to step 305.

In step 305, the receiver determines whether the potential ranging code in the second OFDM symbol duration matches a ranging code assigned to the receiver. If the ranging code is found in the second OFDM symbol duration, in step 307, the receiver determines whether a CINR value of the first OFDM symbol duration is greater than or equal to a preset threshold value TBD_3. If the CINR value is greater than or equal to the preset threshold value TBD_3 indicating that the data received in the first OFDM symbol duration is corrupt, in step 309, the receiver deletes data regarding the ranging code. That is, a potential ranging code may not have been detected in the first OFDM symbol duration due to interference of another signal, and thus, data regarding the received ranging code is deleted. However, if the CINR value of the first OFDM symbol duration is less than the preset value TBD_3, in step 311, the receiver recognizes that the received signal is late, and thus performs timing offset correction whereby timing is shifted forward by (one OFDM symbol length—CP length).

If the potential ranging code of the second OFDM symbol duration in step 305 does not match any ranging code assigned to the receiver, in step 313, the receiver determines whether the potential the ranging code in the first OFDM symbol duration matches a ranging code assigned to the receiver. If the ranging code is found in the first OFDM symbol duration, the receiver recognizes that the received signal is early. Then, in step 317, the receiver performs timing offset correction whereby timing is shifted backward by (one OFDM symbol length—CP length). If the potential ranging code of the $1^{st}$ OFDM symbol duration does not match any ranging code assigned to the receiver, in step 315, the receiver recognizes that the initial ranging detection has failed.

Meanwhile, if both potential ranging codes of the first OFDM symbol duration and the second OFDM symbol duration match the same ranging code assigned to the receiver, in step 319, the receiver determines whether timing offset values and ranging code numbers detected in the first OFDM symbol duration and the second OFDM symbol duration coincide. If the values coincide with each other, the receiver sets the ranging code number and the timing offset value as a final result and ends the ranging code detection operation.

Otherwise, if the timing offset values and the code numbers detected in the first OFDM symbol duration and the second OFDM symbol duration do not coincide with each other, in step 321, the receiver determines differences between the timing offset values and the code numbers detected in the two durations. If there is no difference in the code numbers and the difference between the timing offset values is less than a preset threshold value TBD_1, it is judged that the two code numbers are to be the same and the receiver determines a timing offset according to a specified rule (step 323). For example, the timing offset of the OFDM symbol with the higher CINR value may be selected as the final timing offset value. Alternatively, the two timing offset values may be averaged so that a mean value of the two timing offset values is set as the final timing offset value.

If there is no difference in the code numbers and the difference between the timing offset values is greater than or equal to the preset threshold value TBD_1, in step 325, the receiver compares the CINR value of the first OFDM symbol duration (hereinafter, referred to as "CINR1") with the CINR value of the second OFDM symbol duration (hereinafter, referred to as "CINR2").

In step 327, the receiver determines whether CINR2 is greater than CINR1 and whether a difference thereof is greater than or equal to a preset threshold value TBD_2. If CINR2 is greater than or equal to CINR1 by more than the preset threshold value TBD_2, the receiver recognizes that the received signal is late and thus performs timing offset correction whereby timing is shifted forward by (one OFDM symbol length—CP length) (step 311).

If the condition of step 327 is not satisfied, the receiver determines whether CINR1 is greater than CINR2 and a difference thereof is greater than or equal to the preset threshold value TBD_2. If CINR1 is greater than or equal to CINR2 by more than the preset threshold value TBD_2, the receiver recognizes that the received signal is early, and thus the receiver performs timing offset correction whereby timing is shifted backward by (one OFDM symbol length—CP length) (step 317).

If the difference between CINR1 and CINR2 is not greater than or equal to the preset threshold value TBD_2, the receiver determines a timing offset according to a specified rule (step 331). For example, the timing offset of the OFDM symbol having a higher CINR value may be selected as a final timing offset value. Alternatively, the two timing offset values may be averaged so that a mean value of the two timing offset values is set as the final timing offset value.

Although the ranging code and the timing offset are described as being detected using two OFDM symbol durations in the exemplary embodiments of the present invention, the operation of FIG. 3 may be adapted such that detection is performed using more than two symbol durations.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. An apparatus for a base station of a wireless communication network, the apparatus comprising:
   a detector for detecting an access code received from a mobile station in each of a plurality of time durations and for detecting a timing offset of the access code detected in each of the plurality of time durations;
   an estimator for estimating a Carrier-to-Interference Noise Ratio (CINR) during each of the plurality of time durations; and
   a determining unit for determining a timing offset correction value to be applied to subsequent signals from the mobile station using the CINR, the timing offset, and the access code detected in each of the plurality of time durations,
   wherein, if an access code of a first time duration is the same as an access code of a second time duration, and a difference between a timing offset of the first time duration and a timing offset of the second time duration is less than a threshold value, then the timing offset correction value is set as any one of the two timing offsets or as an average value of the two timing offsets.

2. The apparatus of claim 1, wherein the detector includes:
   a receiver for performing Orthogonal Frequency Division Multiplexing (OFDM) modulation on a received signal to convert the received signal into frequency-domain data;
   a sampler for selecting the frequency-domain data from each of the plurality of time durations; and
   an offset detector for detecting the access code and the timing offset from each of the selected data.

3. The apparatus of claim 1, wherein the access code comprises an initial ranging code.

4. The apparatus of claim 1, wherein, if an access code and a timing offset of a first time duration are the same as an access code and a timing offset of a second time duration, then the timing offset correction value is set as the same timing offset of the first and second time durations.

5. The apparatus of claim 1, wherein, if an access code of a first time duration is the same as an access code of a second time duration, and a difference between a timing offset of the first time duration and a timing offset of the second time duration is greater than a first threshold value, and a CINR of the second time duration (CINR2) is greater than a CINR of the first time duration (CINR1) by more than a second threshold value, then the timing offset correction value is set whereby timing is shifted forward by an amount equal to one Orthogonal Frequency Division Multiplexing (OFDM) symbol length minus a cyclic prefix length.

6. The apparatus of claim 1, wherein, if an access code of a first time duration is the same as an access code of a second time duration, and a difference between a timing offset of the first time duration and a timing offset of the second time duration is greater than a first threshold value, and a CINR of the first time duration (CINR1) is greater than a CINR value of the second time duration (CINR2) by more than a second threshold value, then the timing offset correction value is set whereby timing is shifted backward by an amount equal to one Orthogonal Frequency Division Multiplexing (OFDM) symbol length minus a cyclic prefix length.

7. The apparatus of claim 1, wherein, if an access code is detected in a second time duration but not in a first time duration, then the timing offset correction value is set whereby timing is shifted forward by an amount equal to one Orthogonal Frequency Division Multiplexing (OFDM) symbol length minus a cyclic prefix length.

8. The apparatus of claim 1, wherein, if an access code is detected in a second time duration but not in a first time duration, and a CINR of the first time duration is greater than or equal to a threshold value, then the access code and the timing offset are discarded.

9. The apparatus of claim 1, wherein, if an access code is detected in a first time duration but not in a second time duration, then the timing offset correction value is set whereby timing is shifted backward by an amount equal to one Orthogonal Frequency Division Multiplexing (OFDM) symbol length minus a cyclic prefix length.

10. A method for a base station of a wireless communication system, the method comprising:
   detecting an access code received from a mobile station in each of a plurality of time durations and a timing offset of the access code detected in each of the plurality of time durations;
   estimating a Carrier-to-Interference Noise Ratio (CINR) during each of the plurality of time durations; and
   determining a timing offset correction value to be applied to subsequent signals from the mobile station using the CINR, the timing offset, and the access code detected in each of the plurality of time durations,
   wherein, if an access code of a first time duration is the same as an access code of a second time duration, and a difference between a timing offset of the first time duration and a timing offset of the second time duration is less than a threshold value, then the timing offset correction value is determined to be any one of the two timing offsets or an average value of the two timing offsets.

11. The method of claim 10, wherein the detecting includes:
   performing Orthogonal Frequency Division Multiplexing (OFDM) modulation on a received signal to convert the signal into frequency-domain data;
   selecting the frequency-domain data from each of the plurality of time durations; and
   detecting the access code and the timing offset from each of the selected data.

12. The method of claim 10, wherein the access code comprises an initial ranging code.

13. The method of claim 10, wherein, if an access code and a timing offset of a first time duration are the same as an access code and a timing offset of a second time duration, then the timing offset correction value is determined to be the same timing offset of the first and second time durations.

14. The method of claim 10, wherein, if an access code of a first time duration is the same as an access code of a second time duration, and a difference between a timing offset of the first time duration and a timing offset of the second time duration is greater than a first threshold value, and a CINR of the second time duration (CINR2) is greater than a CINR of the first time duration (CINR1) by more than a second threshold value, then the timing offset correction value is determined whereby timing is shifted forward by an amount equal to one Orthogonal Frequency Division Multiplexing (OFDM) symbol length minus a cyclic prefix length.

15. The method of claim 10, wherein, if an access code of a first time duration is the same as an access code of a second time duration, and a difference between a timing offset of the first time duration and a timing offset of the second time duration is greater than a first threshold value, and a CINR of the first time duration (CINR1) is greater than a CINR of the second time duration (CINR2) by more than a second threshold value, then the timing offset correction value is determined whereby timing is shifted backward by an amount equal to one Orthogonal Frequency Division Multiplexing (OFDM) symbol length minus a cyclic prefix length.

16. The method of claim 10, wherein, if an access code is detected in a second time duration but not in a first time duration, then the timing offset correction value is determined whereby timing is shifted forward by one Orthogonal Frequency Division Multiplexing (OFDM) symbol length minus a cyclic prefix length.

17. The method of claim 10, wherein, if an access code is detected in a second time duration but not in a first time duration, and a CINR of the first time duration is greater than or equal to a threshold value, then the access code and the timing offset are discarded.

18. The method of claim 10, wherein, if an access code is detected in a first time duration but not in a second time duration, then the timing offset correction value is determined whereby timing is shifted backward by an amount equal to one Orthogonal Frequency Division Multiplexing (OFDM) symbol length minus a cyclic prefix length.

* * * * *